Sept. 18, 1923.
J. R. NAGUES
SPOT REMOVER
Filed Jan. 30, 1922
1,468,541
2 Sheets-Sheet 1
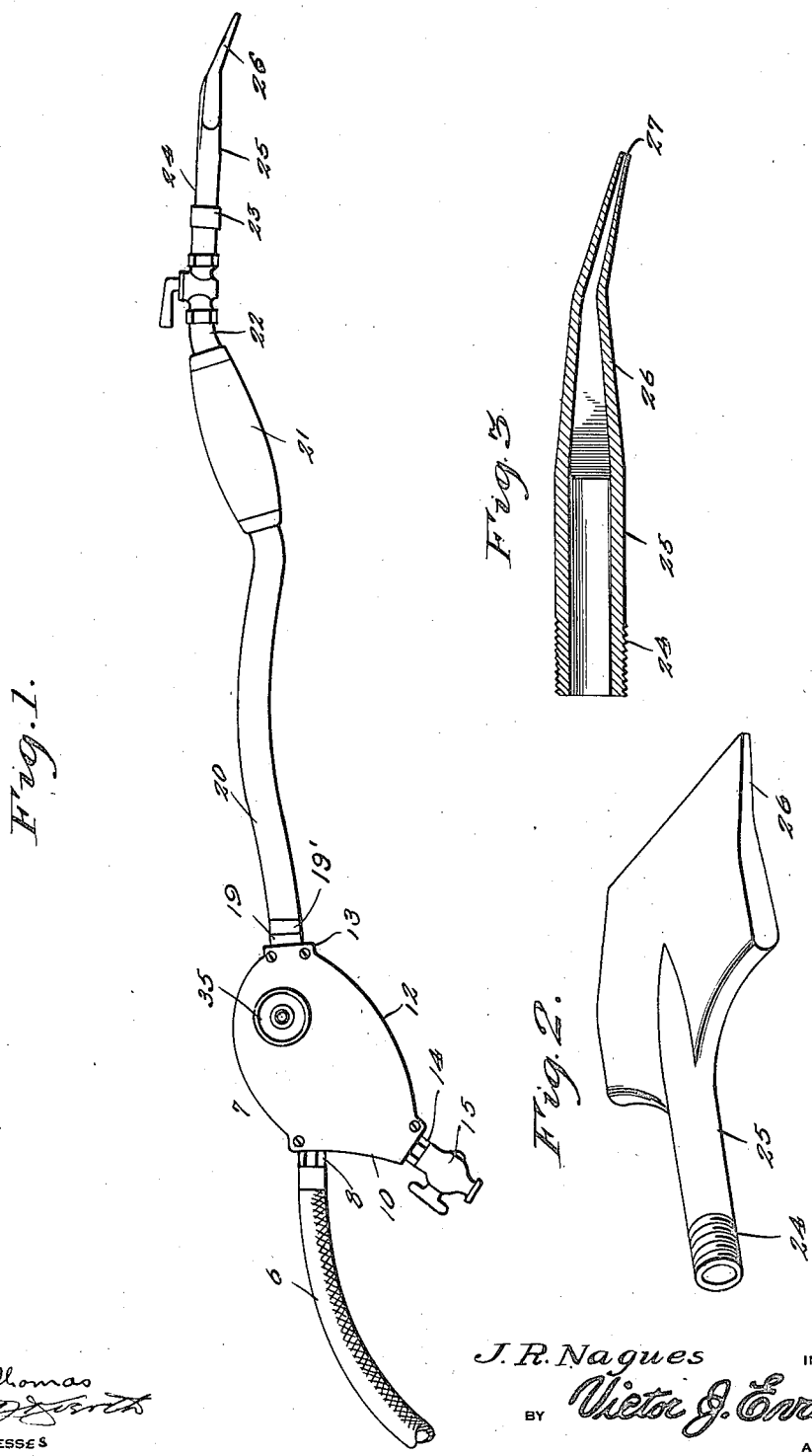

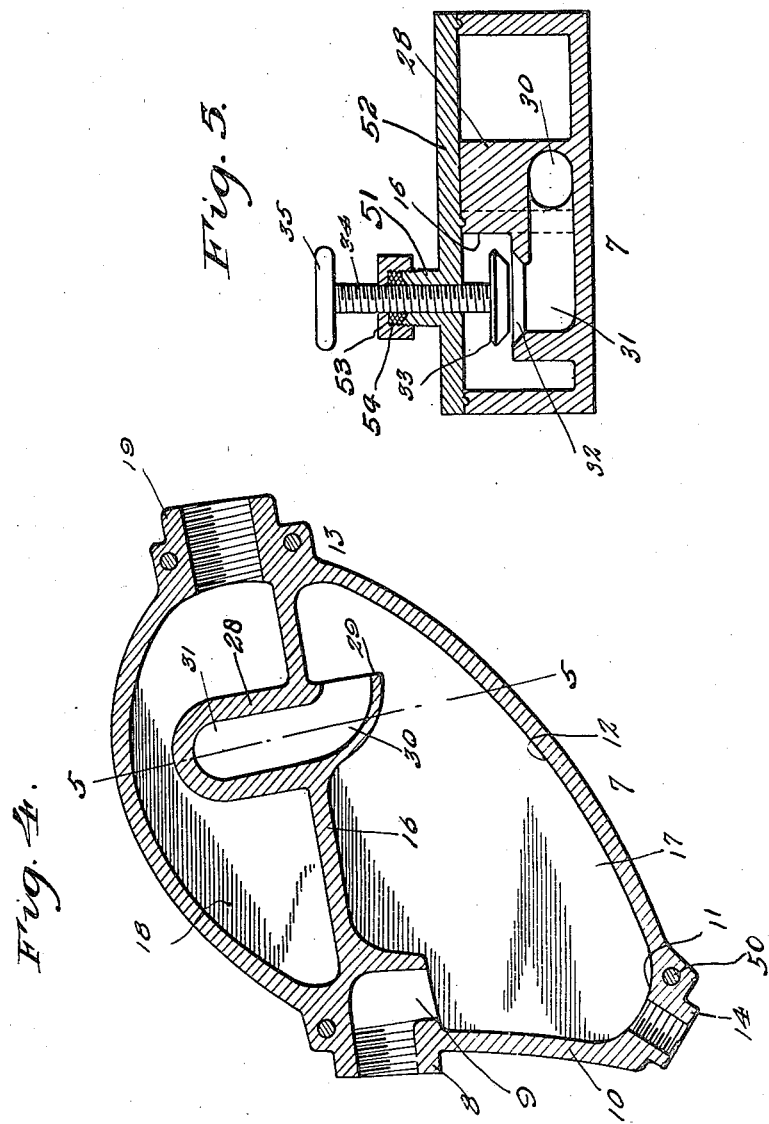

Patented Sept. 18, 1923.

1,468,541

UNITED STATES PATENT OFFICE.

JESSE RULE NAGUES, OF MISSOULA, MONTANA.

SPOT REMOVER.

Application filed January 30, 1922. Serial No. 532,875.

*To all whom it may concern:*

Be it known that I, JESSE RULE NAGUES, a citizen of the United States, residing at Missoula, in the county of Missoula and State of Montana, have invented new and useful Improvements in Spot Removers, of which the following is a specification.

My present invention has reference to a clothes cleaning apparatus.

The primary object of this invention is to produce a means whereby stains on garments or other fabrics can be removed therefrom in an easy and expeditious manner without liability of injury to the fabric.

A further object is to produce a garment cleaning apparatus which is primarily in the nature of a spot remover in which steam under compression is directed against the spot to be removed from the garment, and wherein means is provided for permitting a determined quantity of moisture to flow with the steam and wherein the flow of such moisture may be prevented so that dry steam only will be directed against the garment.

The foregoing, and other objects which will appear as the nature of the invention is better understood, may be accomplished by a construction, combination and operative association of parts, such as is disclosed by the drawings which accompany and which form part of this specification.

In the drawings:—

Figure 1 is a side elevation of the improvement.

Figure 2 is a perspective view of the nozzle end of the device.

Figure 3 is an approximately central longitudinal sectional view through the construction disclosed in Figure 2.

Figure 4 is a sectional view on the line 4—4 through the steam trap or expansion chamber, on a greatly enlarged scale.

Figure 5 is a sectional view on the line 5—5 of Figure 4.

In carrying out my invention, I make use of a steam generator (not shown). To the outlet of the generator I connect a flexible tube 6 and this tube is connected directly to the expansion chamber or trap which forms an essential feature of this invention. The trap 7 is substantially oval-shaped in side elevation, but the side walls thereof are straight and parallel. For distinction the ends of the trap are indicated by the numerals 10 and 13 respectively. The end 10 of the trap is formed with an angle passage 9 surrounded by a boss 8 and to this boss the tube 6 is connected. The end 10 of the trap, below the boss 8 is straight but terminates in a round wall 11 which merges into the lower wall 12 of the trap. The trap, centrally of the rounded wall 11 is provided with a threaded opening surrounded by an outstanding boss 14 to which is attached a drain cock 15.

The trap 7, above the angle inlet passage 9 has a transverse partition 16 dividing the said trap into a lower compartment 17 and an upper compartment 18. The end 13 of the trap, in a line with the wall of the partition 16 in the compartment 18 is provided with a threaded opening surrounded by a boss 19, and in this opening there is threaded a nipple 19' to which is attached a flexible pipe extension 20.

The tube extension 20 may be and preferably is provided with a handle portion 21, adjacent to its outer end, the said handle having its outer end provided with an angle pipe extension or neck 22 whose passage may, if desired, be controlled by a valve. This, however, is not a necessity as will be presently aparent. The outer end of the neck 22 has an enlarged extension in the nature of an interiorly threaded sleeve 23 in which is screwed the threaded end 24 of the pipe conductor 25 for the nozzle 26. The nozzle, in the present instance is flat in plan, but has its top beveled or arranged at an inclination toward the bottom thereof, but is spaced away from the said bottom to provide the mouth 27 of the nozzle.

Cast with the partition 16 and projecting into both compartments 17 and 18 there is a hollow member 28. This member has a straight side 29 in the compartment 17 opposite the end 13 of the trap, the said straight wall being provided with a rounded inlet opening 30 that communicates with the bore or passage 31 in the member 28. By reference to Figure 5 of the drawings it will be seen that the body of the member extends the entire width of the trap and has a tongue and groove engagement with one side of the trap when the latter is provided with such removable side. This side of the trap is in the nature of a plate having a tongue and groove engagement with the edges of the body of the trap proper and being secured thereon by screws or bolts 50. The reduced side of the member 28, which is extended into the compartment 18 has a flared opening 32 that communicates with its passage 31, the said opening providing a seat for a valve 33. The valve 33 has a threaded stem 34 which projects through on opening surrounded by a boss 51 in the removable side 52 of the trap. Screwed on the boss is a packing nut 53 to compress a packing 54 between the bore of the boss and the threaded stem 34 of the valve 33. The stem 34 has its outer end provided with an operating handle 35.

From experience, I have found in cleaning spots from fabrics that the employment of spotting fluids and brushes is injurious to the garment and that an application of either dry or moistened steam under pressure will successfully remove a spot or stain in an expeditious manner without injury to the garment. With my improvement, when the valve 32 is closed steam from the boiler is let into the lower expansion chamber 17. The steam condenses therein, and when such condensation is required with the live steam in the cleaning or removing of spots from certain classes of garments, I open the valve 33, so that the live steam acting on the water in the chamber 17 will force the same from the compartment 17 through the compartment 18 and through the nozzle. When moist steam is not required, before letting the steam into the chamber 17, I open the cock 15, permitting all condensation to drain from the said chamber 17. I then close the cock 15, either before or after opening the valve 32, permitting steam to flow directly through the trap and through the nozzle. Because of the tortuous passage which must be taken by the steam through the compartment 17, the steam which is directed against the garment is to all intents and purposes perfectly dry, and it is thought that the foregoing description, when taken in connection with the drawings will fully set forth the construction and advantages of the improvement to those skilled in the art to which such inventions relate. It is, however, thought necessary to state that I do not wish to be restricted to the precise shape of the trap as herein described, nor to the precise construction of the nozzle, as in the manufacture of my improvement I may make such changes therefrom as fall within the scope of what I claim.

Having described the invention, I claim:—

1. In a steam garment cleaner, a hose comprising a steam conducting line having its passage controlled by a valve and having a nozzle at its outer end, and a steam trap in the steam line, including a chamber in which the steam is received and a chamber through which the steam finds an outlet, means directing the inflowing steam toward the bottom of the first mentioned chamber, a valve controlling the steam passage between the chambers operable exteriorly of the strap, and a valved outlet for the steam inlet chamber.

2. In a steam garment cleaner, a hose comprising a steam conducting line having its passage controlled by a valve and having a nozzle on its outer end, a steam trap in the line including a chamber which the steam enters and a chamber from which the steam finds an outlet, a valve controlled port at the bottom of the first mentioned chamber, means for directing the entering steam toward the bottom of the said chamber, said trap having an angle steam passage between the chambers, and a valve in the passage controlling the flow of steam from the first to the second mentioned chamber.

3. In a steam garment cleaner, a hose comprising a steam conducting line having a nozzle on its outer end, a steam trap in the steam line comprising a member divided by a partition into a chamber in which the steam is received and a chamber from which the steam finds an outlet, said trap having an angle passage for the inflowing steam whereby to direct the steam toward the bottom of the first mentioned chamber, said first mentioned chamber having a valve controlled drain, at its bottom, a hollow member formed with the partition projecting into both of the chambers, said member having a rounded passage entering from one side thereof, said hollow member providing a valve chest in the second mentioned chamber, and a valve operable exteriorly of the trap controlling the steam passage between the chest and second mentioned chamber.

In testimony whereof I affix my signature.

JESSE RULE NAGUES.